(12) United States Patent
Helms et al.

(10) Patent No.: US 7,858,886 B2
(45) Date of Patent: Dec. 28, 2010

(54) MOUNTING BRACKET AND METHOD

(75) Inventors: Brandon Lowry Helms, Cornelius, NC (US); Robert Brian Groat, Greensboro, NC (US)

(73) Assignee: Clarolux, L.L.C., Greensboro, NC (US)

( * ) Notice: Subject to any disclaimer, the term of this patent is extended or adjusted under 35 U.S.C. 154(b) by 0 days.

(21) Appl. No.: 12/098,885

(22) Filed: Apr. 7, 2008

(65) Prior Publication Data

US 2009/0251033 A1   Oct. 8, 2009

(51) Int. Cl.
*H05K 7/14* (2006.01)
(52) U.S. Cl. .................. 174/535; 361/809; 361/733; 174/60
(58) Field of Classification Search ............ 174/60, 174/63, 64, 50, 520, 535, 542; 361/733, 361/809
See application file for complete search history.

(56) References Cited

U.S. PATENT DOCUMENTS

| | | |
|---|---|---|
| 4,327,396 A | 4/1982 | Schacht |
| 4,642,733 A | 2/1987 | Schacht |
| 5,034,856 A | 7/1991 | Cook et al. |
| 5,177,325 A | 1/1993 | Giammanco |
| 5,235,494 A | 8/1993 | Chang et al. |
| 5,402,487 A * | 3/1995 | Swett .................. 379/435 |
| 5,587,874 A | 12/1996 | Hoppensteadt et al. |
| 5,675,122 A | 10/1997 | Taylor |
| 5,796,585 A | 8/1998 | Sugiyama et al. |
| 5,837,933 A | 11/1998 | Fligelman |
| 5,903,438 A | 5/1999 | Deschamps et al. |
| 5,930,111 A | 7/1999 | Yamazaki et al. |
| D433,995 S | 11/2000 | Romano |
| 6,191,358 B1 * | 2/2001 | Daoud .................. 174/50 |
| 6,359,218 B1 | 3/2002 | Koch et al. |
| 7,236,353 B2 | 6/2007 | Davidson et al. |
| 2006/0176653 A1 | 8/2006 | Davidson et al. |
| 2008/0289845 A1* | 11/2008 | Le .......................... 174/66 |

FOREIGN PATENT DOCUMENTS

GB   2386316 A   9/2003

* cited by examiner

*Primary Examiner*—Hung V Ngo
(74) *Attorney, Agent, or Firm*—Moore & Van Allen PLLC; R. Brian Drozd; Michael G. Johnston (57) ABSTRACT

The present invention is directed to a bracket for mounting housing for accommodating electrical components. The bracket comprises a base member capable of being mounted to a surface. The bracket may also comprise a sidewall extending from the base member and a system for mounting the electrical component housing to the sidewall of the base member, so that when the electrical component housing is connected to the bracket, a space is defined between the base member and the electrical component housing.

18 Claims, 9 Drawing Sheets

MOUNTING BRACKET AND METHOD

BACKGROUND

This invention relates generally to a housing for electronic equipment, and more particularly to a bracket for use in mounting the housing for electronic equipment.

Housings for electronic equipment, such as electrical transformers, are typically manufactured and sold as boxes with the electrical components already installed. Accordingly, connecting the electrical components to a power source can be cumbersome. Additionally, replacing currently installed housing for electronic equipment can be a difficult and expensive task.

For the foregoing reasons, there is a need for a structure for that will allow for relatively quick and easy installation, or replacement, of housings for electronic equipment.

SUMMARY

According to the present invention, a bracket for mounting housing for accommodating electrical components may include a base member capable of being mounted to a surface. The bracket may also include a sidewall extending from the base member and means for mounting the electrical component housing to the sidewall of the base member such that a space is defined between the base member and the electrical component housing.

Also, in accordance with the present invention, a housing assembly may include a housing member and a bracket capable of being fixed to a surface. The bracket may include a base member, a sidewall extending from the base member, and means for mounting the housing member to the sidewall of the base member. The housing assembly may further include means for removeably attaching the housing member to the mounting means. When the housing assembly is mounted to the bracket, the housing member is spaced from the base member.

Further, in accordance with the present invention, a method is provided for mounting a housing for accommodating electrical components. The method includes providing a bracket comprising a base capable of being mounted to a surface, at least one sidewall extending from the base, and means for mounting the electrical component housing to the at least one sidewall. The method may further comprise securing the bracket to a surface and mounting the electrical component housing to the bracket.

These and other objects, features and advantages of the present invention will be apparent from the following description thereof and appended claims in which references are made to the accompanying drawings.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," "transverse" and "downward" merely describe the configuration shown in the FIGS. Indeed, the components may be oriented in any direction and the terminology, therefore, should be understood as encompassing such variations unless specified otherwise.

As used herein, the term "housing for electrical components" or "electrical component housing" may mean any structure for accommodating electrical components. Thus, it is understood that a housing for electrical components or an electrical component housing could be transformers, electrical boxes, conduit boxes, or any other structure that is used for accommodating or supporting electrical components. The electrical component housing may include electrical components, as defined below.

Also, as used herein, the term "electrical components" may mean any electrical element, device and/or equipment. Electrical components may therefore, without limitation, include switches, circuit breakers, relays, connector blocks, transformers, and discrete electrical components, such as resistors and capacitors, connected in circuit with any electronic device, including integrated circuit chips or any other device that can be used in the field of electricity generation, use or control.

Figure 1:
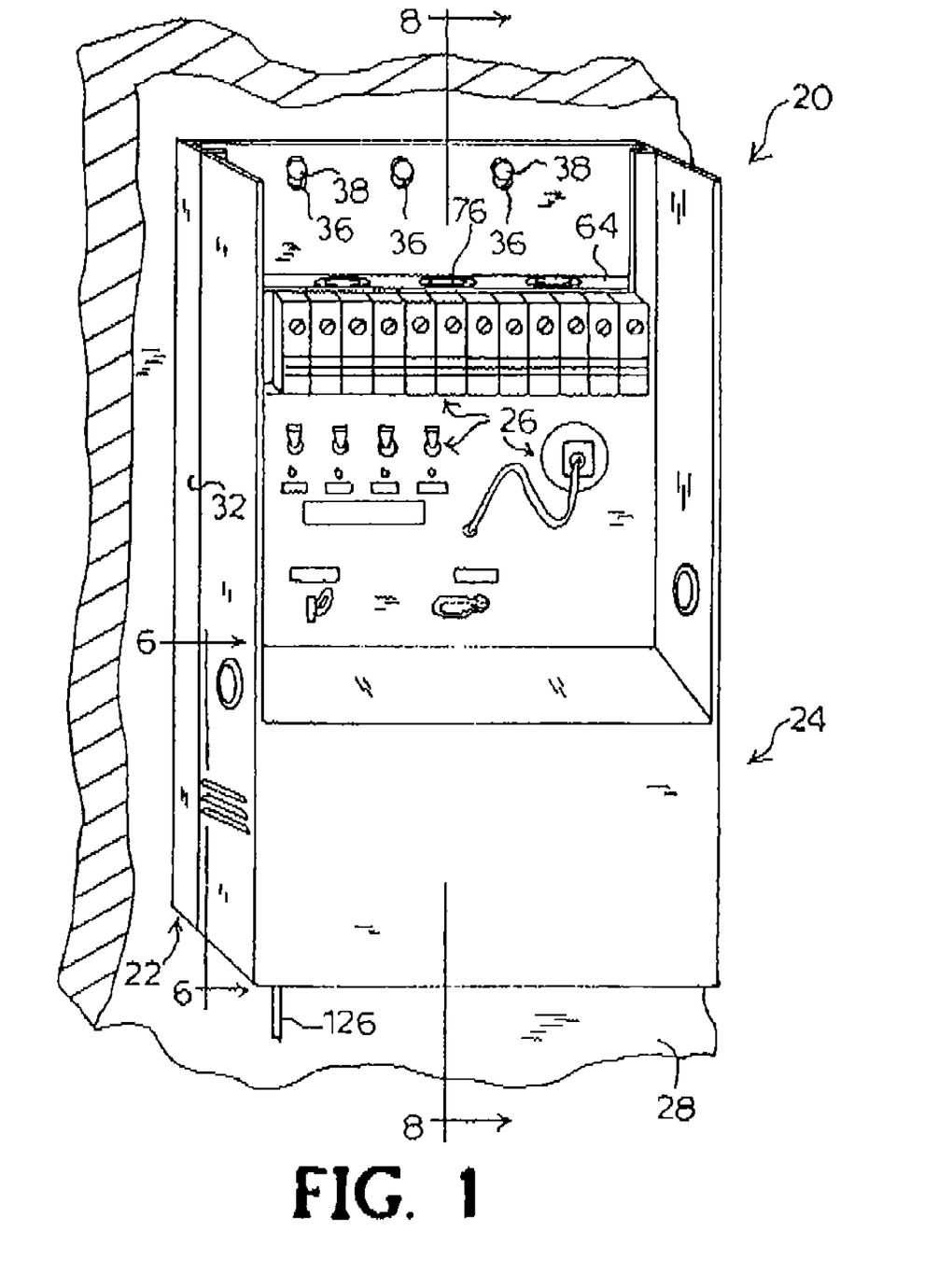
FIG. 1 is a perspective view of a housing for accommodating electrical components, wherein the housing is mounted to a bracket according to an embodiment of the present invention.
Figure 2:
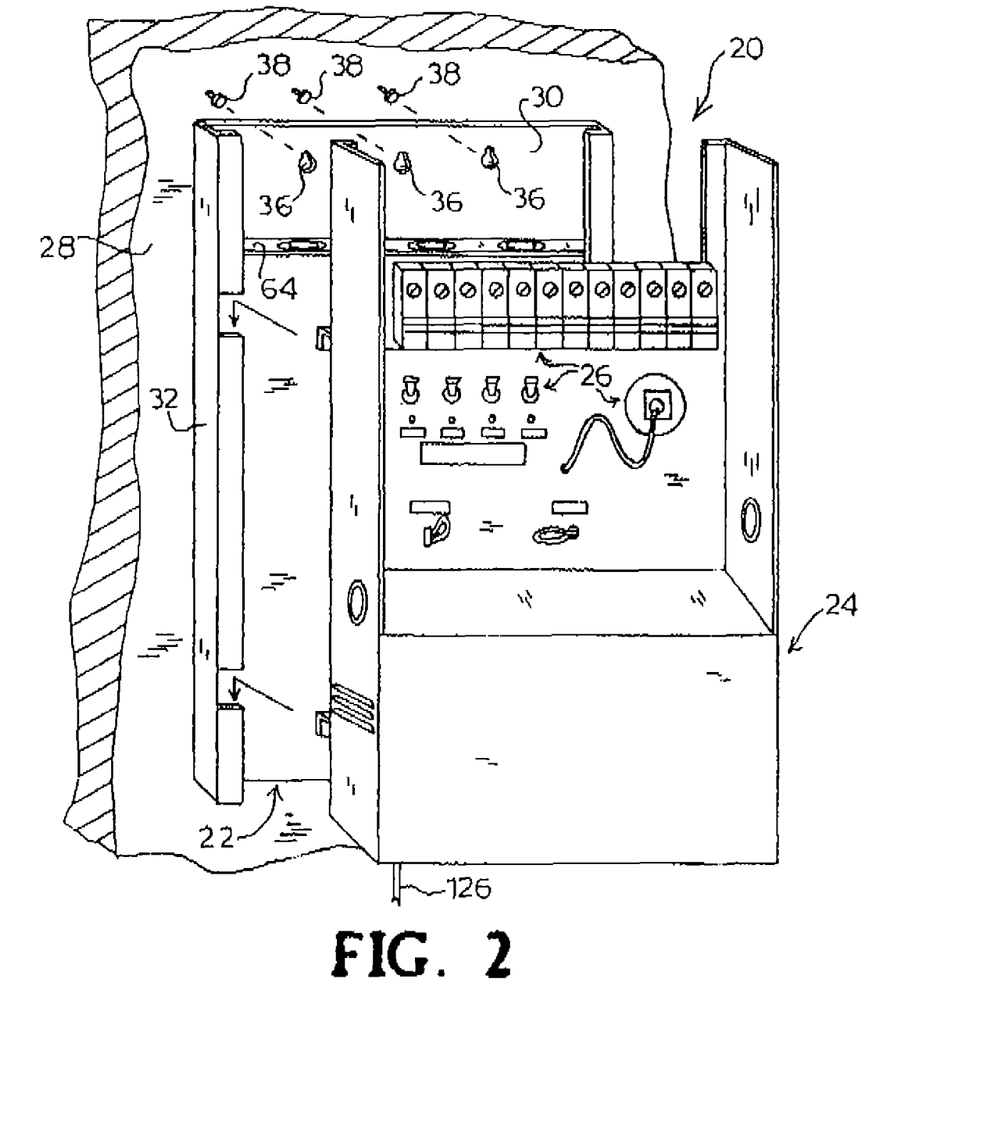
FIG. 2 is an exploded perspective view of the housing assembly as shown in FIG. 1.

Referring now to the drawings, wherein like reference numerals designate corresponding or similar elements throughout the several view, various show embodiments of a housing assembly according to the present invention are shown and generally designated at 20. As shown in FIGS. 1 and 2, the housing assembly 20 comprises a housing 24 for accommodating electrical components 26 and a bracket 22 for removeably securing the electrical component housing 24 to any supporting surface 28, such as a wall. FIGS. 1-2 show the electrical component housing 24 having a plurality of electrical components; however, it should be understood that the electrical component housing 24 may house more or less components than what is shown, or may house no components at all such that the housing 24 is empty. In the embodiments shown, the housing 24 is representative of an electrical transformer for converting input power to power usable to a load, such as low-level outdoor lighting.

Figure 3:
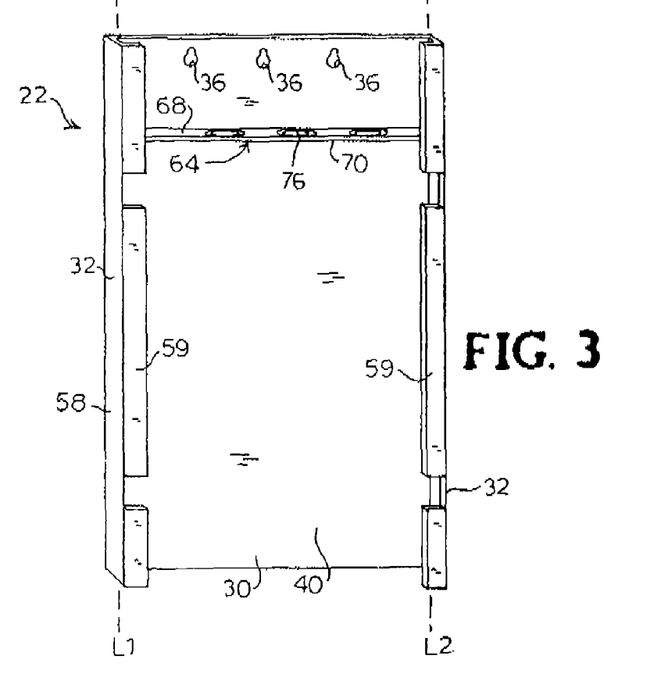
FIG. 3 is a front elevation view of a mounting bracket according to FIG. 1.
Figure 4:
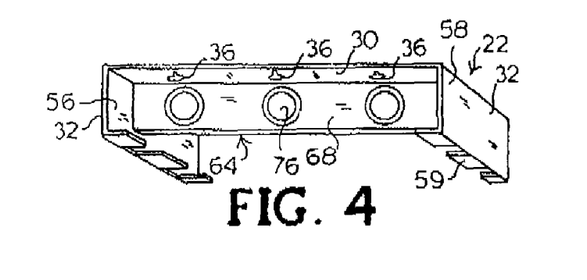
FIG. 4 is a top perspective view of the mounting bracket shown in FIG. 3.
Figure 5:
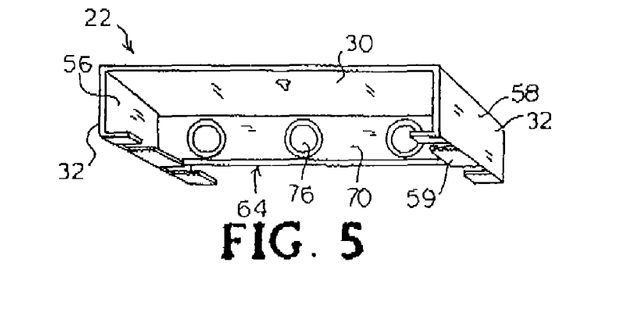
FIG. 5 is a bottom perspective view of the mounting bracket shown in FIG. 3.

The bracket 22 comprises a base 30, sidewalls 32, and means for mounting the electrical component housing 24 to the bracket 22. Referring to FIGS. 3-5, the base 30 may be a generally planar element that takes on any shape, such as a substantially rectangular shape, as shown. The bracket 22 may be fabricated from any material, including, but not limited to, any sheet metal, (e.g. steel, aluminum, etc.), plastic, fiberglass, metal or any other type of rigid material.

The base 30 includes a front surface 40 and a rear surface 42. The front surface 40 of the base 30 corresponds to an internal surface of the housing assembly 20 and the rear surface 42 corresponds to an outer surface of the bracket 22 when the electrical component housing 24 is mounted to or assembled with the bracket 22. Additionally, the surface of the base 30 may be of any appropriate dimension so as to conform to the shape of the supporting surface 28 from which the bracket 22 might be suspended.

The base 30 may have one or more openings 36 to provide a means for attaching the base 30 to the supporting surface 28 by, e.g., fasteners 38, bolts, hooks, nails, etc. These openings 36 may be of any shape, such as a round hole, a keyhole slot, eyelet-shape, etc. It is understood that any other suitable means may be used for attaching the base 30 to the supporting structure 28. Examples of such attaching means may include hooks, flanges, additional mounting brackets, and the like.

The sidewalls 32 extend generally perpendicularly from the respective side edges of the base 30. In the configuration shown, the sidewalls 32 are substantially parallel to one another. Each sidewall 32 has an inwardly facing surface 56 and an outwardly facing surface 58. Each inwardly facing surface 56 faces in the direction toward the center of the base 30. Each sidewall 32 may further include a flange 59 extending inwardly from the edge of the sidewall 32. The sidewalls 32 define an open area therebetween. While the bracket 22 can be assembled by fastening separate sidewalls 32 to the base 30 (e.g. as by welding, L-bracket, etc.), the bracket 22 is shown in FIG. 3 as a single integral sheet folded along two vertical fold lines L1, L2 for forming the sidewalls 32.

The bracket 22 may also include a transverse wall 64 extending from the base 30 transversely between the sidewalls 32. The transverse wall 64 includes a top surface 68 and a bottom surface 70 and may extend to, and interconnect with, the sidewalls 32. The transverse wall 64 may divide the open area of bracket 22 into two separate compartments, including a lower compartment defined by a lower surface of the wall and the inner surfaces of each of the sidewalls 32. The transverse wall 64 also has holes 76 to allow for conduit 66 to be mounted to the bracket 22 (FIG. 7) or to allow access for electrical wires 77. The transverse wall 64 may be connected to the base 30 or at least one of the sidewalls 32 of the bracket 22 by any means (not shown), such as welding, L-shaped brackets, fasteners, and the like.

The bracket 22 may also have knockout stampings (not shown) which provide access passageways for passing electrical cables to the electrical component housing 24 through the base 30 or sidewalls 32. Similar knock-out stampings may be included in the electrical component housing 24.

Figure 6A:
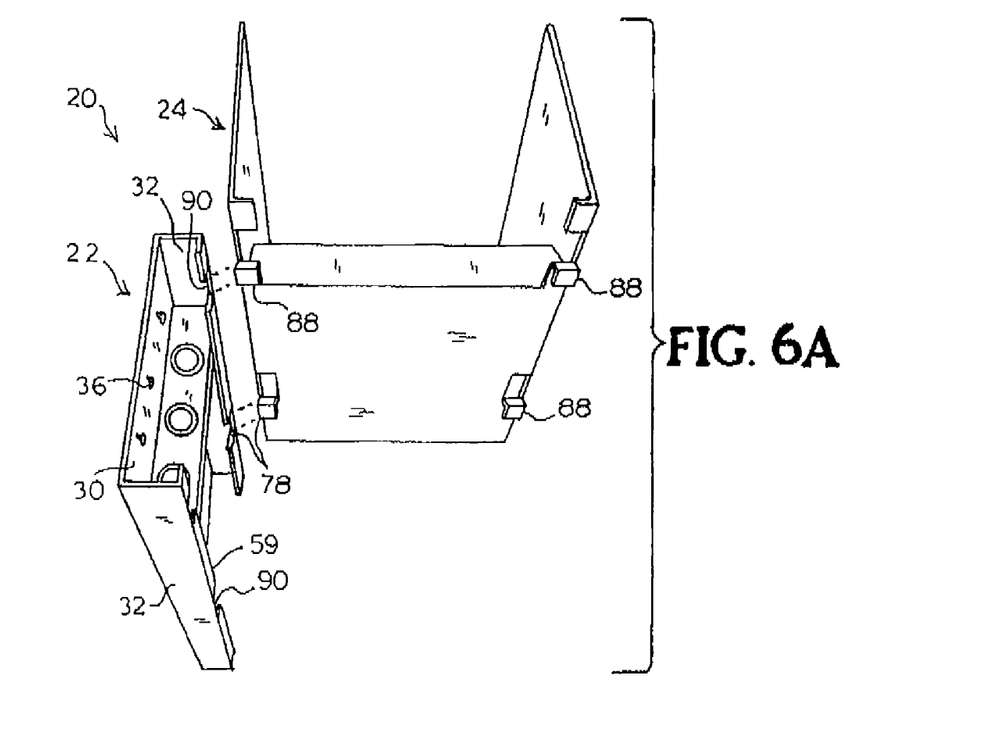
FIG. 6A is a top exploded perspective view of the housing assembly shown in FIG. 1, wherein the housing has been rotated 90 degrees relative to the bracket.

Means are provided for mounting the electrical component housing 24 to the sidewalls 32. In the embodiment shown in FIGS. 1-5, the mounting means comprises a hook and slot system 78. As can be seen in FIG. 6A, downwardly-opening hooks 88 are attached adjacent to the edges of the electrical component housing 24. Two spaced hooks 88 are provided on each of opposed edges of the electrical component housing 24. It should be understood that any other configuration may be possible, including having any number of hooks, placing the hooks at any location on the electrical component housing 24, placing the hooks on the bracket, and the like. Corresponding to each respective hook, slots 90 are formed in the flanges 59 that extend from the edges of the sidewalls 32 (FIG. 3). Each slot 90 is capable of receiving a respective hook 88.

Figure 6B:
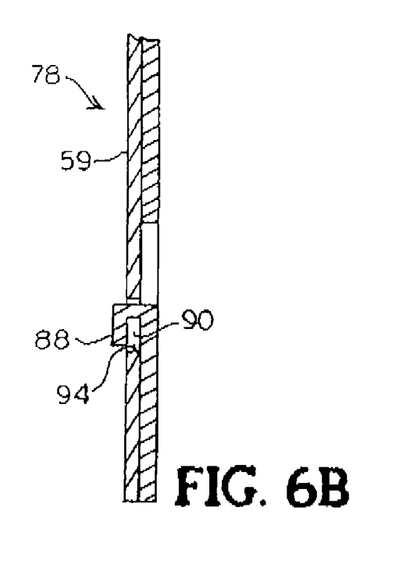
FIGS. 6B-C are cross-sectional views of the mounting means system of FIG. 1 taken along line 6-6.
Figure 6C:
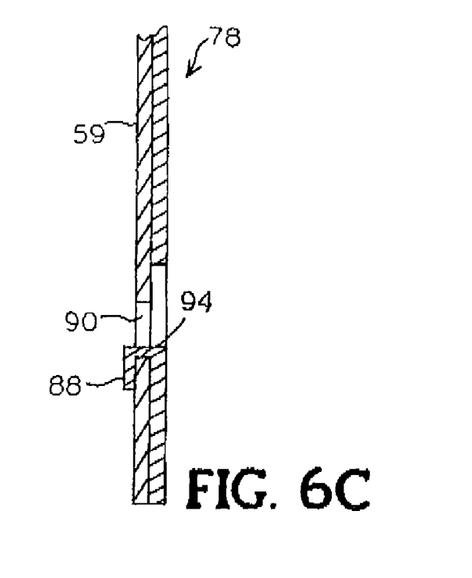

As illustrated in FIGS. 6B and 6C, in order to attach the electrical component housing 24 to the bracket 22, the housing is positioned with the rear surface of the housing 24 adjacent to the sidewalls such that each hook 88 from the electrical component housing 24 slides into a corresponding slot opening 90 in the flanges 59. This position is shown in FIG. 6B. The housing 24 is then lowered relative to the bracket 22 such that each hook 88 moves downwardly in each respective slot 90. This position is shown in FIG. 6C. When attached, each hook 88 rests on the lower edge 94 of each corresponding slot 90, with the slots 90 supporting the weight of the electrical component housing 24 and the rear surface of the housing 24 abutted against the flanges 59. In order to detach the electrical component housing 24 from the bracket 22, the electrical component housing 24 may be lifted relative to the bracket 22 to the position in FIG. 6B, such that the hooks 88 may then be transferred out of the slots 90 as the housing 24 is pulled away from the bracket 22.

Various mounting means, other than the hook and slot system 78, may include pin and sleeve systems 80, pin and eyelet systems 82, hinges 84, hooks 86, magnets (not shown) and the like. Exemplary mounting means and mounting means systems are described further below with reference to FIGS. 6D-I.

Figure 6D:
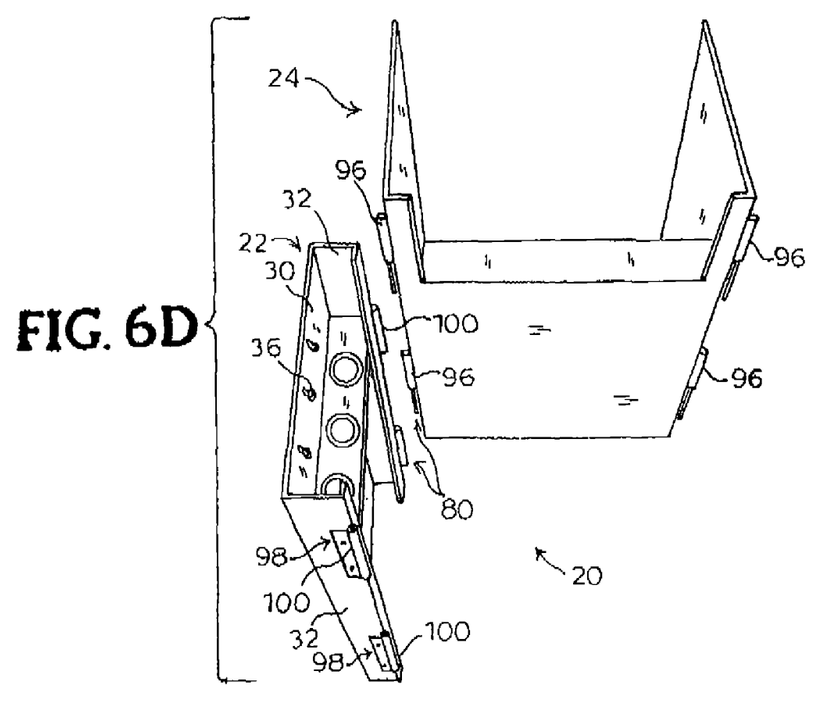
FIG. 6D is a perspective view of the mounting bracket and electrical component housing with another mounting means system according to another embodiment of the present invention, wherein the housing has been rotated 90 degrees relative to the bracket.
Figure 6E:
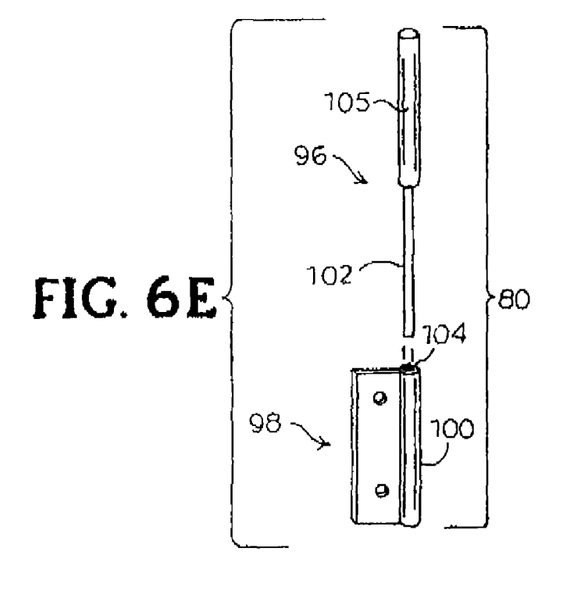
FIG. 6E is a close-up view of the mounting means system of FIG. 6D.

In FIGS. 6D-E, another illustrated embodiment of the mounting means is shown as a pin and sleeve mounting system 80. In this system 80, a sleeve 100 is shown as being attached to the bracket 22 while a pin 96 is attached to the electrical component housing 24. The pin 96 is orientated in a downward position and the receiving end 98 of the sleeve 100 faces an upward position. Each pin 96 has a lower portion 102 that is capable of being inserted into the receiving portion 104 of the sleeve 100 and an upper portion 105 that does not fit into the receiving portion 104 of the sleeve 100. To attach the electrical component housing 24 to the bracket 22, the lower portion 102 of the pin 96 may be inserted into the receiving portion 104 of the sleeve 100 until the upper portion 105 of the pin 96 makes contact with the sleeve 100. Conversely, to remove the electrical component housing 24 from the bracket 22, the electrical component housing 24 is moved relative to the bracket 22 until the pin 96 is removed from the sleeve 100.

Figure 6F:
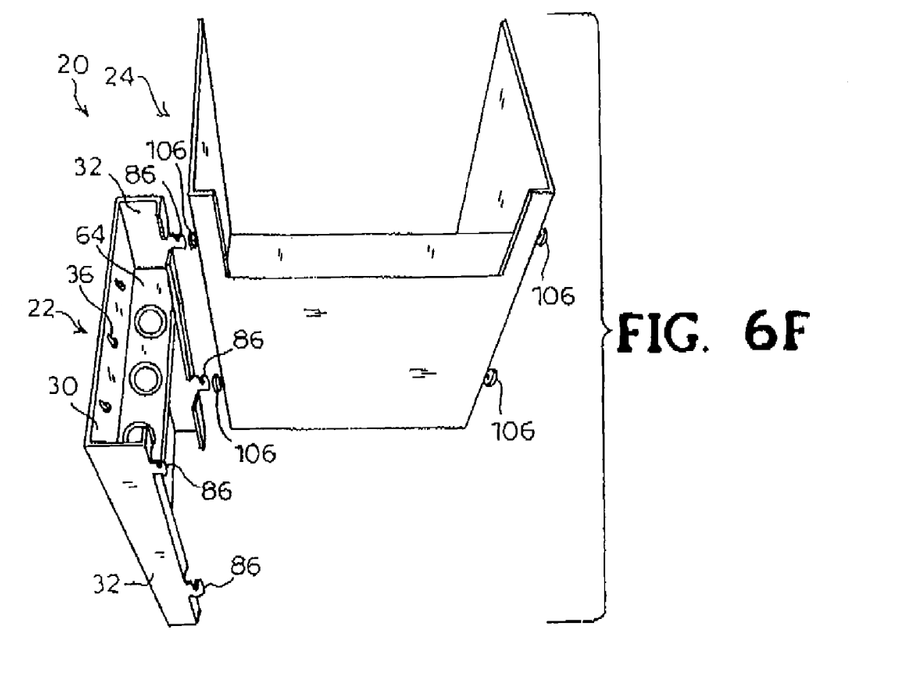
FIG. 6F is a perspective view of the mounting bracket and electrical component housing with yet another mounting means system according to yet another embodiment of the present invention, wherein the housing has been rotated 90 degrees relative to the bracket.

In FIG. 6F, another illustrated embodiment of the mounting means is shown, including hooks 86 connected to the edges of the sidewalls 32 of the bracket 22. The sidewalls 32 may be configured such that the hooks 86 fit around the exterior sides of the electrical component housing 24. Pins 106 that mate with the hooks 86 may be attached to the electrical component housing 24. The pins 106 may be a piece of rigid material of any shape (e.g. round, cylindrical, square, etc.) capable of resting on the groove of the hooks 86 for supporting the weight of the electrical component housing 24. Exemplary pins 106 may include rods, bolts, screws, and the like. In order to attach the electrical component housing 24 to the bracket 22, each pin 106 is lowered onto the groove defined by each respective hook 86. The hooks 86 then support the pin 106, and accordingly the weight of the electrical component housing 24. To detach the electrical component housing 24 from the bracket 22, the pins 106 are lifted off of the hooks 86 by vertically lifting the electrical component housing 24.

Figure 6G:
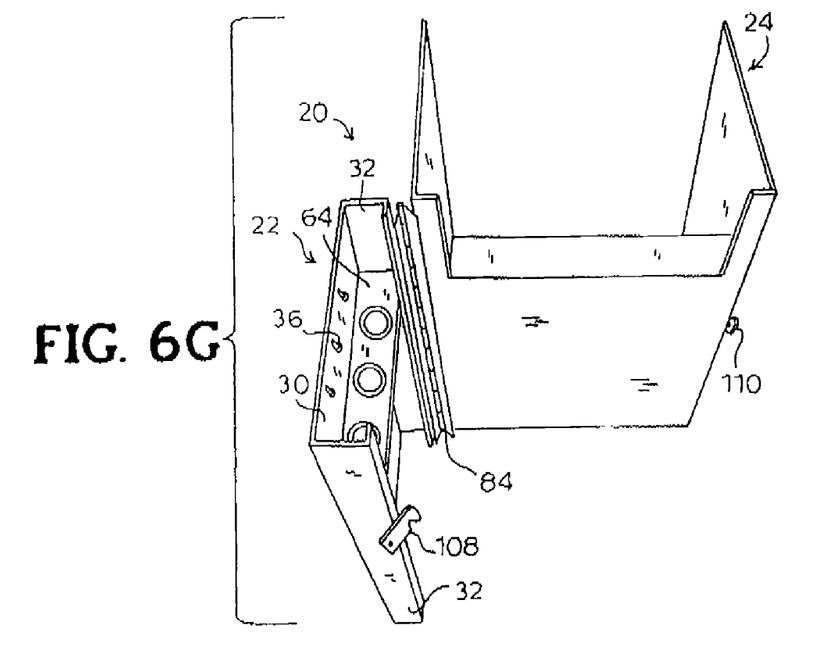
FIG. 6G is a perspective view of the mounting bracket and electrical component housing with yet another mounting means system according to even yet another embodiment of the present invention, wherein the housing has been rotated 90 degrees relative to the bracket.

In FIG. 6G, yet another illustrated embodiment of the mounting means is shown as a hinge 84. The hinge 84 may be employed to connect the electrical component housing 24 with one sidewall 32 of the bracket 22. One side of the hinge 84 may be connected to a portion of the electrical component housing 24 and the other side of the hinge may be connected to one of the sidewalls 32 of the bracket 22. The hinge 84 allows the electrical component housing 24 to rotate about the sidewall 32 that the hinge 84 is connected to. A connector 108, such as a latch, may be attached to the opposing sidewall 32 of the bracket 22. The connector 108 may removeably join to a pin 110 that is secured to the electrical component housing 24 so as to prevent the electrical component housing 24 from swinging away from the bracket 22. The hinge 84 may be removeably fastened (e.g. by fasteners, screws, bolts, etc.) and/or may be permanently fixed (e.g. as by welding) to one of the sidewalls 32 and/or the electrical component housing 24.

Figure 6H:
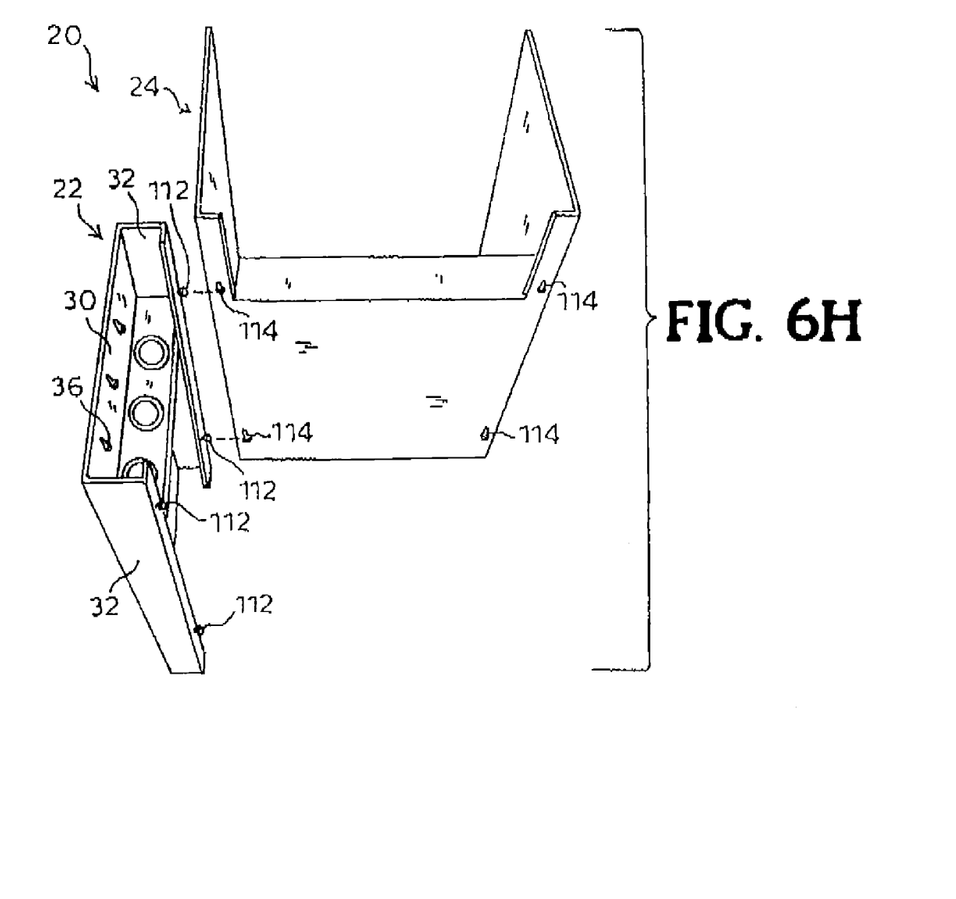
FIG. 6H is a perspective view of the mounting bracket and electrical component housing with yet another mounting means system according to yet another embodiment of the present invention, wherein the housing has been rotated 90 degrees relative to the bracket.
Figure 6I:
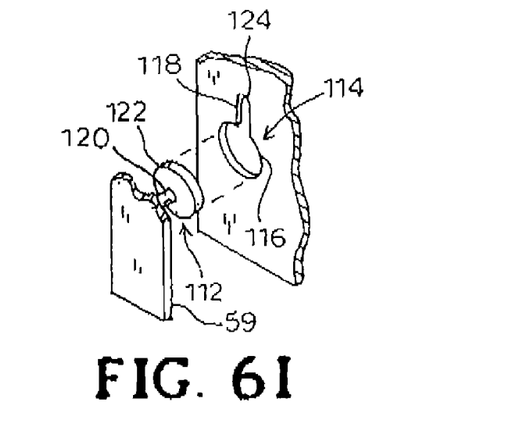
FIG. 6I is a close-up view of the mounting means system of FIG. 6H.

In FIGS. 6H-6I, yet another illustrated embodiment of the mounting means is shown as a pin and eyelet system 82. In this system 82, at least one pin 112 is attached to the electrical component housing 24 and the bracket 22 has eyelets 114 corresponding to each pin 112. The eyelet 114 has a lower portion 116 and an upper portion 118, where the radius of the upper portion 118 is smaller than the radius of the lower portion 116. The pin 112 may have a torso 120 and a head 122 at the end of the torso 120. The head 122 is larger in radius than the torso 120 of the pin 112 and the radius of the upper portion 118 of the eyelet 114, but is smaller than the radius of the lower portion 116 of the eyelet 114. To attach the electrical component housing 24 to the bracket 22, each pin 112 is inserted into the lower portion 116 of the eyelet 114 and the electrical component housing 24 is lowered so that the upper perimeter 124 of each eyelet 114 rests on each respective pin 112. The head 122 of the pin 112 prevents the pin 112 from horizontally sliding out of the upper portion 118 of the eyelet 114. To detach the electrical component housing 24 from the bracket 22, the electrical component housing 24 is lifted so that the head 122 of the pin 112 aligns with the lower portion 116 of the eyelet 114 and the pin 112 is then horizontally removed from the eyelet 114.

It is understood that the mounting means, as shown in and described above with reference to FIGS. 6A-6I, are not limited to the above embodiments. Any other suitable mounting means may be used to mount the electrical component housing 24 to the bracket 22.

Further, in each of the above embodiments of the mounting means, either portion of the mounting means may be integral with the sidewall 32 or may be fastened separately (e.g. welded) to the sidewall 32 of the bracket 22; similarly, either portion of the mounting means may be connected to, or integral with, the electrical component housing 24.

Figure 7:
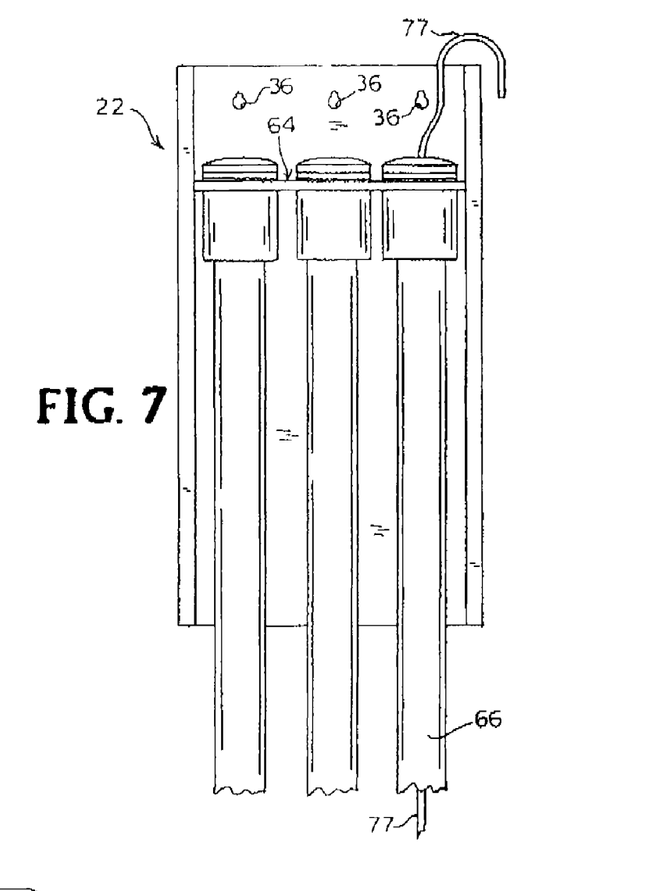
FIG. 7 is front view of a mounting bracket according to another embodiment of the present invention.

In use, the bracket 22 is secured to a supporting structure 28 by the fastening means 38. Prior to mounting the electrical component housing 24 to the bracket 22, an installer may perform a pre-wiring step using electrical wires 77 which will be used for outputting electrical current and voltage from the electrical component housing 24 to any desired load (not shown), such as any low-level lighting system. The pre-wiring step includes pulling electrical wires 77 through the holes 76 of the transverse wall 64 or through conduit 66 that may be mounted to the holes 76 of the transverse wall 64 (FIG. 7). The pre-wiring step may also include temporarily placing or permanently affixing the electrical wires 77 to the bracket 22 in any manner, such as hanging the wires over the sidewalls (FIG. 7), attaching the wires to the transverse wall 64, and the like. The pre-wiring step positions the electrical wires 77 so that the wires may be easily attached to the appropriate electrical components 26 in the electrical component housing 24 after the housing 24 is mounted to the bracket 22.

Next, the electrical component housing 24 is mounted to the bracket 22 via the mounting means, as previously discussed with reference to FIGS. 6A-6I. This effectively mounts the electrical component housing 24 to the supporting surface 28.

Figure 8:
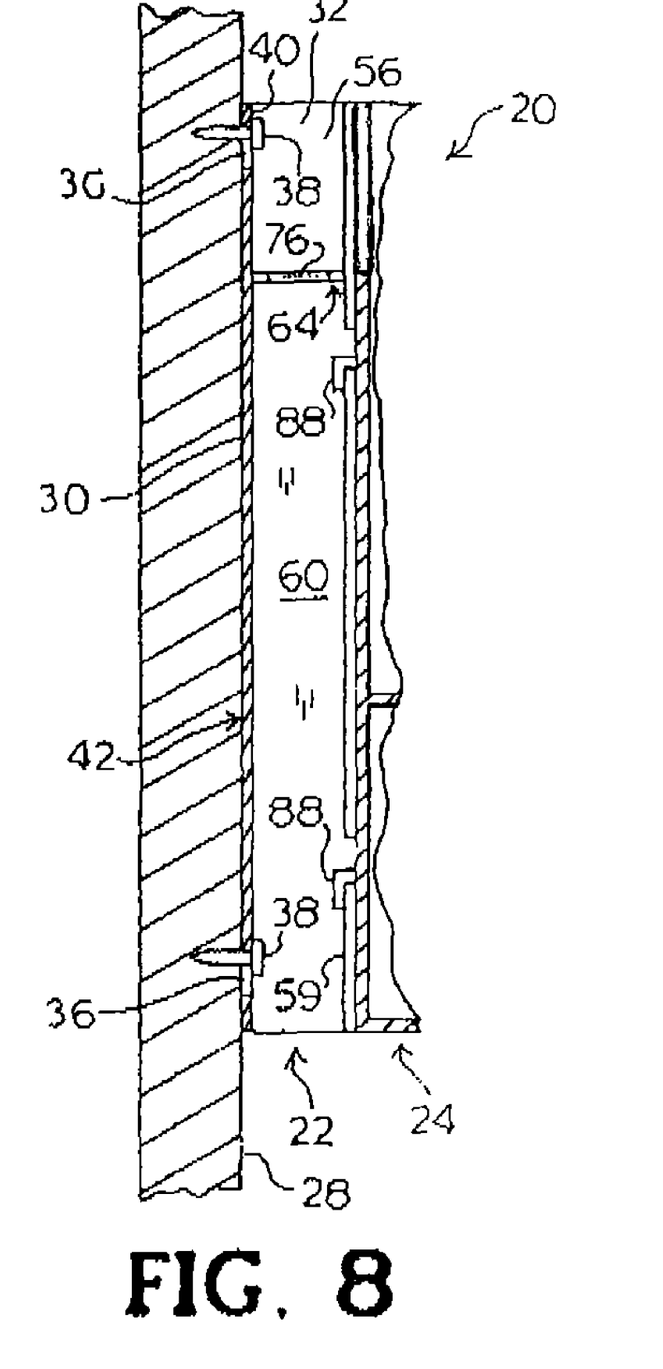
FIG. 8 is a cross-sectional view of the housing assembly shown in FIG. 1 taken along line 8-8 in FIG. 1.
Figure 9:
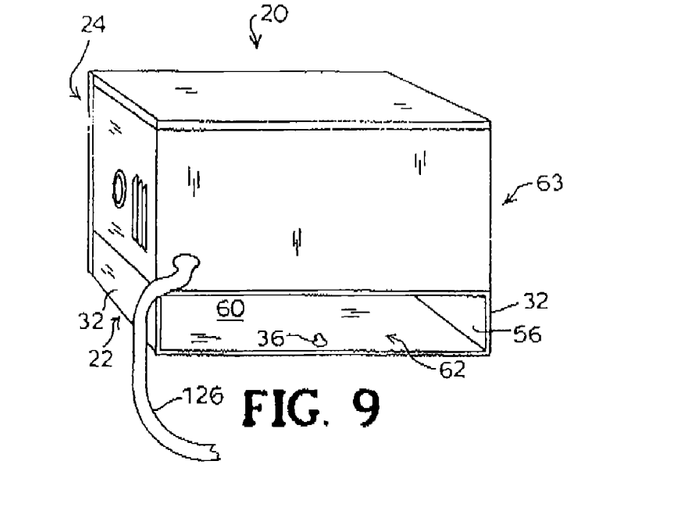
FIG. 9 is a bottom perspective view of the housing assembly shown in FIG. 1.

As shown in FIG. 8, when the electrical component housing 24 is mounted to the bracket 22, an internal space 60 is defined between the inner surface of the base 30, the rear surface of the housing 24, and the inner surfaces of the sidewalls 32. In one embodiment, the internal space 60 may be further defined by a lower surface of the transverse wall 64, the inner surface of the base 30, the rear surface of the housing 24, and the inner surfaces of the sidewalls 32. The extension of the sidewall 32 from the base 30 determines the depth of the internal space 60 between the base 30 and the electrical component housing 24. The internal space 60 is large enough for receiving electrical wires 77, conduit 66, and the like. As best seen in FIG. 9, the internal space 60 is accessible via an opening 62 in the bottom 64 of the housing assembly 20. The opening 62 is of a sufficient size to permit electrical wires 77, conduit 66 and the like to access the internal space 60 through the opening 62 in the bottom 64 of the housing assembly 20.

After mounting the electrical component housing 24 to the bracket 22, the connection of the wires 77 to the electrical components 26 may be completed. The wires 77 that were pulled via the pre-wiring step are located in the internal space 60 of the housing assembly 20 with the ends of the wires 77 extending through the transverse wall 64. In one embodiment, the transverse wall 64 may be affixed to the bracket 24 at the same height as to where the electrical components 26 are accessible to the mounting bracket 22 (FIG. 1). This permits the ends of the wires 77 to be proximate to its eventual affixation location, in the embodiments shown, the electrical components 26. An installer may simply connect the ends of the pulled wires 77 to the appropriate electrical components 26. Once connected, the electrical wires 77 run from the electrical component housing 24 through the internal space 60 of the housing assembly 20 and out the opening 62 of the bottom 64 of the housing assembly 20 eventually to a load so as to permit power to be outputted from the electrical components of the housing 24 to the load. The electrical component housing 24 may be connected to a power source (not shown) by plugging a power cord 126 of the housing 24 into an outlet (not shown) of the power source. Power may then be applied via the power source and the housing assembly 20 may be used for its intended use.

At any time (such as for maintenance, replacement, upgrades, etc.), the electrical component housing 24 may be detached from the bracket 22 via the mounting means, as previously described with regard to FIGS. 6A-6I. Additional steps may be required in disconnecting the housing 24 from the bracket 22, such as disconnecting the wires 77 from the electrical components or disconnecting any other device attached to the electrical component housing 24. Allowing the electrical component housing 24 to be easily and quickly removed from the bracket 22 gives free access to the housing 24 for performing various operations after installation, such as performing repair work, upgrading systems or maintenance and/or replacing the electrical component housing 24 altogether.

Through the use of the mounting bracket, installation of the electrical components 26 and wiring may be facilitated in a more expedient manner. The electrical component housing 24 may be of substantial weight, such as about 20 pounds or more. By mounting the electrical component housing 24 to the bracket 22 prior to wiring the electrical component housing 24, the bracket 22 bears the weight of the housing 24 while allowing an installer to quickly complete the installation and wiring. Additionally, an installer can utilize the internal space 60 to quickly and more effortlessly complete the wiring of the housing assembly 20 without the challenges and disadvantages of the prior art.

Although the present invention has been shown and described in considerable detail with respect to only a few/particular exemplary embodiments thereof, it should be understood by those skilled in the art that it is not intended to limit the invention to the embodiments since various modifications, omissions and additions may be made to the disclosed embodiments without materially departing from the novel teachings and advantages of the invention, particularly in light of the foregoing teachings.

We claim:

1. A bracket for mounting a housing for accommodating electrical components, the bracket comprising:
   a base member having a longitudinal axis, the base member capable of being mounted to a surface;
   a pair of longitudinal sidewalls extending from the base member;
   a wall extending from intermediate the edges of the base member between the sidewalls and transversely to the longitudinal axis of the base member, the wall defining at least one opening for receiving electrical wire; and
   means for mounting the electrical component housing to at least one of the sidewalls of the base member,
   wherein a space is defined between the base member and the electrical component housing, the space being divided into a first portion and a second portion by the wall.

2. The bracket as recited in claim 1, wherein the space is defined by the sidewalls such that the base member is spaced from the electrical component housing by a distance equal to the width of the sidewalls.

3. The bracket as recited in claim 1, further comprising means for securing the base member to the surface.

4. The bracket as recited in claim 3, wherein the securing means comprises a fastener, wherein the base member defines at least one aperture for receiving the fastener.

5. The bracket as recited in claim 1, wherein the mounting means comprises at least one attachment member integral with at least one sidewall.

6. The bracket as recited in claim 1, wherein the mounting means comprises a hook attached to at least one of the sidewalls and the electrical component housing.

7. The bracket as recited in claim 1, wherein the mounting means comprises a hinge attached to at least one of the sidewalls and the electrical component housing.

8. The bracket as recited in claim 1, wherein the mounting means comprises a pin attached to at least one of the sidewalls and the electrical component housing.

9. The bracket as recited in claim 1, wherein the mounting means comprises a magnet attached to at least one of the sidewalls and the electrical component housing.

10. The bracket as recited in claim 1, wherein the base member is substantially rectangular in shape.

11. The bracket as recited in claim 1, further comprising means for mounting conduit for passing electrical wire to the the wall such that the conduit opens into the at least one opening.

12. The bracket as recited in claim 1, wherein the base member comprises a rigid material.

13. The bracket as recited in claim 1, wherein the base member comprises a metal material.

14. The bracket as recited in claim 1, wherein the sidewalls extend from the base member in a direction that is substantially perpendicular to the base member.

15. A housing assembly comprising:
   a housing member;
   a bracket capable of being fixed to a surface, the bracket comprising:
      a base member having a longitudinal axis,
      a pair of longitudinal sidewall extending from the base member, and
      a wall extending from intermediate the edges of the base member between the sidewalls and transversely to the longitudinal axis of the base member, the wall defining at least one opening for receiving electrical wire; and
   means for mounting the housing member to at least one of the sidewalls,
   wherein the housing member is spaced from the base member when mounted to the bracket defining a space between the base member and the housing member, the space being divided into a first portion and a second portion by the wall.

16. The housing assembly as recited in claim 15, further comprising means for mounting at least one conduit for passing electrical wire to the the wall such that the conduit opens into the at least one opening.

17. The housing assembly as recited in claim 15, wherein the mounting bracket further comprises means for attaching the base member to the surface.

18. The housing assembly as recited in claim 15, further comprising electrical components mounted to an interior portion of the housing member.

* * * * *